Aug. 9, 1955    R. N. ABILD    2,714,803
FUEL METERING DEVICE FOR A TURBOJET ENGINE
Filed Nov. 18, 1950    2 Sheets-Sheet 2

INVENTOR
ROBERT N. ABILD
BY Jack N. McCarthy
AGENT

United States Patent Office 2,714,803
Patented Aug. 9, 1955

2,714,803

FUEL METERING DEVICE FOR A TURBOJET ENGINE

Robert N. Abild, New Britain, Conn., assignor to United Aircraft Corporation, East Hartford, Conn., a corporation of Delaware Application November 18, 1950, Serial No. 196,414

14 Claims. (Cl. 60—39.28)

This invention relates to a fuel meter and in particular to a fuel meter for use with a turbojet engine having an afterburner for metering fuel to the afterburner.

An object of this invention is to provide a fuel meter having an improved valve operating means.

A further object of this invention is to provide a fuel meter which can be used as either a throttle type meter or by-pass type meter with as few changes as possible.

Another object is to provide an improved meter which will proportion fuel flow in accordance with an engine operating variable and vary said proportion in accordance with a second engine operating variable.

Further objects and advantages will be apparent from the following specification and drawing.

Figure 1:
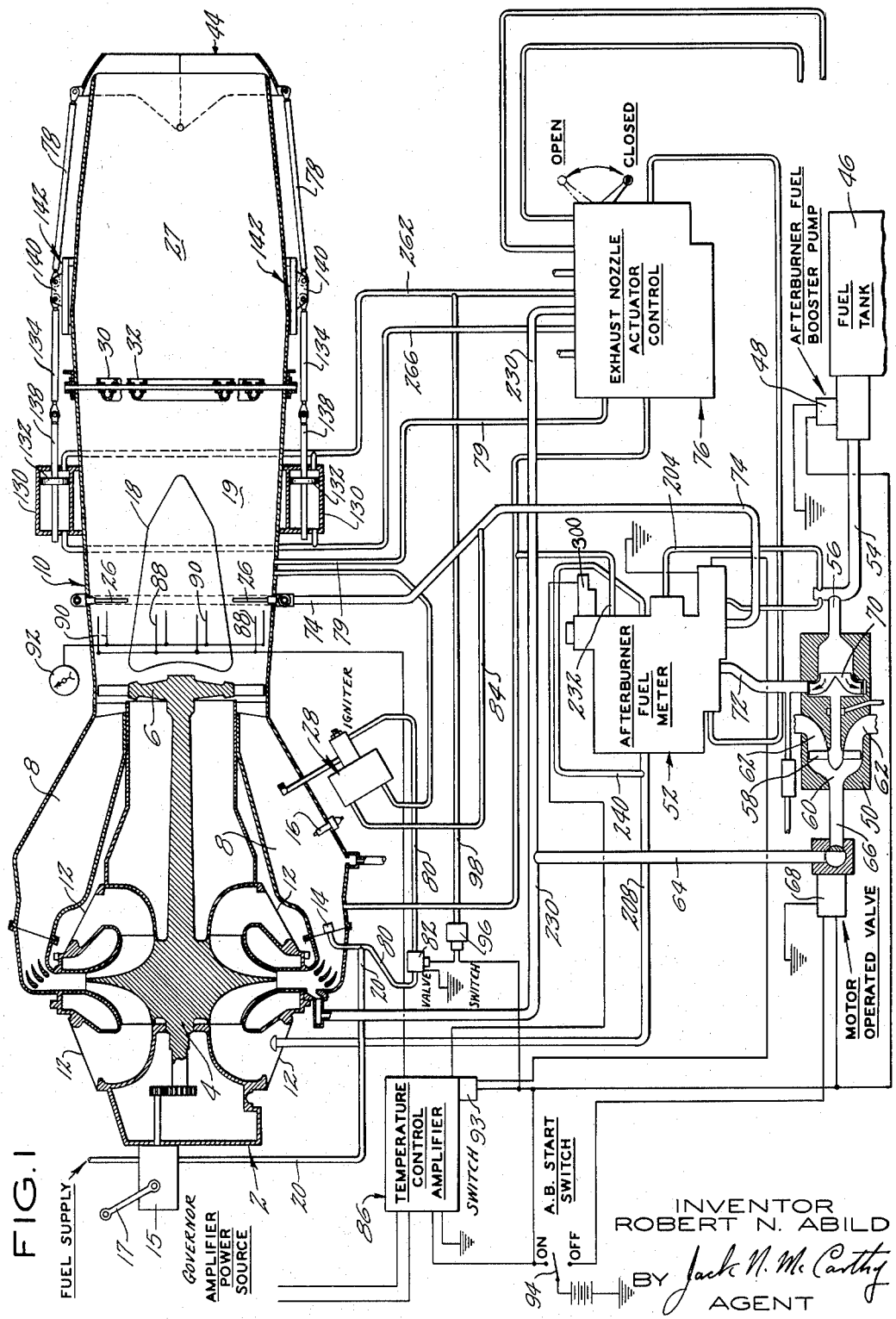
Fig. 1 is a schematic view of a turbojet engine and an afterburner showing the controls for the afterburner.

The turbojet engine 2 has a compressor 4, which, in the arrangement shown, is a centrifugal type, driven by a turbine 6. Combustion chambers 8 therebetween deliver air from the compressor to the turbine. An afterburner 10 is attached at the turbine outlet to provide a means of increasing the thrust.

The engine 2 has two axially-spaced annular intake openings 12 to direct the incoming air into the two oppositely facing annular compressor inlets. Compressed air discharging from the compressor 4 passes to the turbine through the combustion chambers 8 where it is mixed with fuel from fuel nozzles 14. These fuel nozzles 14 receive fuel from the governor 15 through conduit 20. The fuel-air mixture is initially ignited within the combustion chambers 8 by a spark igniter 16. The governor 15 maintains the rotative speed of the turbine rotor assembly in accordance with the value selected by the power lever 17 by controlling fuel flow supplied through conduit 20 and nozzles 14 to the combustion chambers 8.

From the turbine, the gases pass around a cone 18 into the diffuser section 19 of the afterburner When the afterburner is operating, fuel is discharged into these gases from a plurality of fuel nozzles 26 located radially in the diffuser 19. Since the gases leaving the turbine 6 contain considerable unburned oxygen, the additional fuel introduced by fuel nozzles 26 provides a combustible mixture which may be initially ignited within combustion chamber 27 by ignition means hereinafter described, which may be the type shown and claimed in the co-pending applications Serial No. 196,402 filed November 18, 1950 and Serial No. 196,426 filed November 18, 1950. The burning of this combustible mixture is stabilized in the afterburner of the combustion chamber 27 by flameholders 30 and 32. The burned gases discharge from the engine through the nozzle 44 whose area can be varied.

The variable nozzle 44 operates between a minimum opening for engine operation without afterburning and a maximum opening for operation of the engine with after burning. A nozzle and actuating system, similar to the one shown with this invention, is shown and claimed in co-pending application Serial No 193,734 filed November 2, 1950. The actuating system consists of the cylinder 130, piston 132, connecting control rod 134, nozzle control rod 78, piston rod 138, a car 140, and a track mechanism 142 for said car.

The control system can be divided into three main parts. They are the following: (1) the fuel system, (2) the ignition means and (3) the exhaust nozzle actuator control. These three parts are closely coordinated by fluid conduit connections and an electrical system.

The fuel system consists of the fuel tank 46, the fuel booster pump 48, the fuel pump 50, the fuel meter 52 and the fuel nozzles 26. The fuel booster pump 48 is mounted on the fuel tank 46 and is connected to the fuel pump 50 by conduits 54 and 56. The fuel pump 50 is of the turbine type having a turbine rotor 58 mounted therein with an intake passage 60 and exhaust passages 62 for the working fluid. The working fluid, which is shown as compressed air supplied from the compressor outlet of the engine, is delivered to the intake passage 60 by conduits 230, 64 and 66. A motor operated valve 68 is located at the junction of conduits 64 and 66 to control the operation of the fuel pump by regulating the flow of compressed air to the pump. The turbine rotor 58 drives an impeller 70 which provides the pumping action. The fuel pump 50 delivers fuel to the fuel meter 52 through conduit 72. The fuel meter 52 meters the fuel therein and injects it into the engine through conduit 74 and nozzles 26. Fuel meters of this type are also shown and claimed in co-pending application Serial No. 196,423 filed November 18, 1950.

Figure 2:
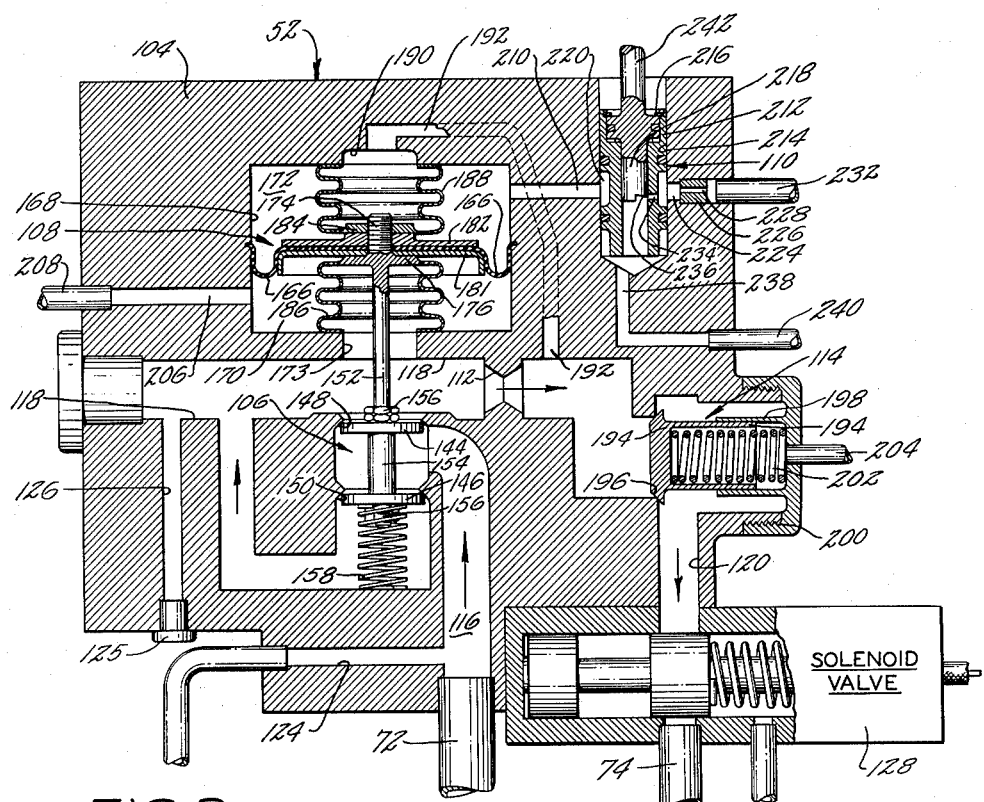
Fig. 2 is an enlarged schematic view of the fuel meter included in Fig. 1.

This fuel meter meters fuel flow as a function of engine air flow and this fuel flow may be attenuated manually or automatically to control some engine performance variable such as turbine discharge temperature. This fuel meter may be either a throttle type meter or a by-pass meter depending on how it is set up. Fig. 2 shows the fuel meter arranged to act as a throttle type meter and Fig. 3 shows the fuel meter arranged to act as a by-pass type meter.

This fuel meter has a housing 104 which contains therein five main parts: a balanced metering or by-pass valve 106, a metering or by-pass valve controlling mechanism 108, a valve assembly 110 for attenuating the measurement of engine air flow in accordance with turbine discharge temperature, a metering orifice 112, and a back pressure valve 114. These parts are interconnected by passages and connected to other devices in the overall system to provide an operative structure. With reference to Fig. 2, which shows the fuel meter arranged to act as a throttle type meter, afterburner fuel is admitted to housing 104 through passage 116 to the metering valve 106, it is metered by valve 106 into passage 118 and passed through the metering orifice 112 and back pressure valve 114 to a fuel outlet passage 120. A passage 124 provides a point at which a conduit may be connected to carry a working fluid to another device.

Figure 3:
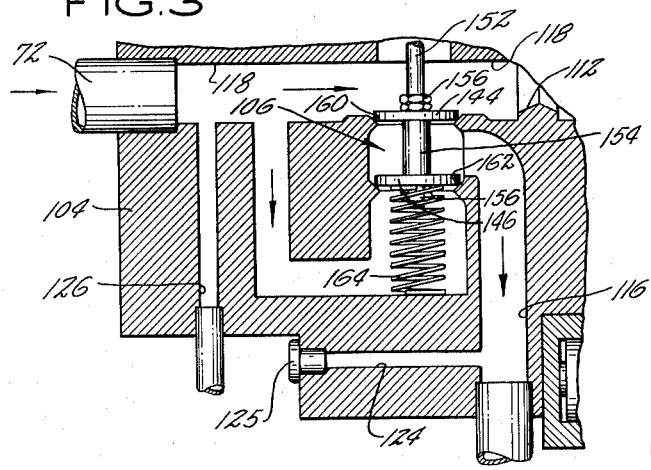
Fig. 3 is a fragmentary schematic view of part of the fuel meter included in Fig. 1 with parts and connections rearranged.

With reference to Fig. 3, this figure shows the portion of the fuel meter which has to be changed to have the fuel meter operate as a by-pass type meter instead of the throttle type. After burner fuel is admitted to housing 104 through passage 118 which is connected to the fuel outlet passage 120 by the orifice 112 and the back pressure valve 114. Fuel is by-passed from passage 118 through by-pass valve 106 to passage 116 which may be connected to conduit 54 or to drain. A passage 126 provides a point at which a conduit may be connected to carry a working fluid to another device. Plug 125 is placed on either passage 124 or 126 depending on the manner in which the meter is to function. A normally closed solenoid operated valve 128 is located between passage 120 and conduit 74.

The metering and by-pass valve, which in Fig. 2 acts as a metering valve, is merely a valve having two valve members 144 and 146. These valve members cooperate with valve seats 148 and 150 when the meter is set up to function as a throttle type as in Fig. 2. The valve members are held apart, on a valve stem 152 by a spacer 154, lock nuts 156 hold the valve members and spacer on the valve stem. This valve is biased to a closed position by spring 158. The valve members cooperate with valve seats 160 and 162 when the meter is set up to function as a by-pass type as shown in Fig. 3. This valve is then biased to an open position by spring 164.

The metering or by-pass valve controlling mechanism 108 has a diaphragm 166 which has its outer edge fixed in a cavity 168 which divides said cavity into two chambers 170 and 172. The valve stem 152 extends through a hole 173 in housing 104 into chamber 170. The end of the valve stem is threaded at 174 and has a flange 176. This threaded end 174 passes through a cup 181, diaphragm 166, a washer 182, and has a nut 184 placed thereon to hold these parts together against flange 176. A bellows 186 is fixed in chamber 170 with one end around flange 176 and the other end around the hole 173. A second bellows 188 is fixed in chamber 172 with one end around nut 184 and the other end around a recess 190 in the upper wall of chamber 172. Recess 190 is connected to the downstream side of metering orifice 112 by passage 192.

This side of the orifice is also connected with back pressure valve 114. This valve consists of a piston 194, with a valve seat 196 on one end, having slidable engagement in a cylinder 198 which is mounted on housing 104 by a threaded portion 200. A spring 202 biases said valve to a closed position, a reference pressure is directed to a chamber formed by said piston and cylinder by conduit 204.

The interior of bellows 186 is connected to the upstream side of orifice 112 through hole 173. The exterior of bellows 186 in chamber 170 and diaphragm 166 which forms one side of said chamber is connected to compressor inlet pressure by passage 206 and conduit 208. The exterior of bellows 188 in chamber 172 and diaphragm 166 which forms one side of said chamber is connected to the attenuating valve assembly by passage 210.

The attenuating valve assembly 110 has a sleeve 212 which is fixed in bore 214 of housing 104. Snap ring 216 holds valve 218 of the assembly in sleeve 212. Sleeve 212 has an annular groove 220 which connects passage 224 which has a bushing 226 with an orifice 228 to passage 210. Passage 224 is connected through conduit 232 to compressor discharge pressure. An orifice 234 connects annular groove 220 to the center of sleeve 212. The lower end of valve 218 provides the valve action by a contour 236 thereon which varies the opening presented by orifice 234. The end of sleeve 212 is connected by passage 238 and conduit 240 to compressor inlet pressure. Valve 218 is rotated by a shaft 242 to vary the restriction formed by contour 236 and orifice 234.

The exhaust nozzle actuator control 76 is a device to divert a pressure to the exhaust nozzle actuating cylinders 130 either to open or to close the exhaust nozzle as required. Compressed air from the compressor 4 is delivered to the nozzle control 76 by conduit 230 to provide the operating pressure. Conduit 262 connects the nozzle control to the side of the cylinders 130 nearest the nozzle which causes the nozzle 44 to open when the operating pressure is applied and conduit 266 connects the nozzle control to the side of the cylinders 130 farthest from the nozzle which causes the nozzle 44 to close when the operating pressure is applied. Turbine exhaust gas static pressure which is delivered to the control 76 by conduit 79 automatically actuates the nozzle control 76 to connect conduit 230 to either conduit 262 or 266. An exhaust nozzle actuator control of this type is shown and claimed in co-pending application Serial No. 196,424 filed November 18, 1950.

The igniter control 28 injects an amount of fuel in addition to that normally supplied into a combustion chamber 8 where it is ignited resulting in flame propagation through the turbine into the afterburner for igniting a combustible mixture in the afterburner. Fuel is provided to the igniter control 28 from the main fuel system by conduit 80 which has a solenoid actuated shut-off valve 82 connected therein. The igniter control is connected by conduit 84 to conduit 74 which provides the actuating pressure to inject the additional fuel to provide ignition in the afterburner.

The electrical system may include a temperature control amplifier 86 which during afterburner operation is sent a signal by thermocouples 88 which sense turbine discharge temperature. Thermocouples 90 also sense turbine temperature but send their signal to a temperature gage 92. This amplifier when energized sends a signal to the fuel meter 52 to attenuate fuel flow in accordance with turbine discharge temperature and controls the operation of a normally closed solenoid operated shut-off valve in the fuel meter 52. When a predetermined turbine discharge temperature is reached, the motor 300 is operated to reduce the flow of fuel to the afterburner if such a reduction is possible; and when a higher temperature is permissible and an increased afterburner fuel flow is possible, the motor 300 is operated to increase the flow of fuel to the afterburner. In the event a temperature is reached in the afterburner above another predetermined temperature and remains after the fuel flow to the afterburner has been reduced by the movement of motor 300 the switch 93 will operate to permit the shut-off valve in the fuel meter to close off the fuel flow to the afterburner. The afterburner switch 94 controls the amplifier 86, sets the motor operated valve 68, controls the fuel booster pump 48, and controls the opening of normally closed solenoid actuated shut-off valve 82.

*Operation*

Afterburner operation is initiated by placing switch 94 in its "on" position. This movement turns the temperature control amplifier on which in turn opens a normally closed solenoid operated shut-off valve in the fuel meter and sends a signal to the afterburner fuel meter for attenuating fuel flow therethrough. This movement of the switch also places motor operated valve 68 in open position, starts the fuel booster pump 48 and opens normally closed solenoid actuated shut-off valve 82.

The operation of the fuel booster pump forces fuel from the fuel tank 46 through conduits 54 and 56 to the impeller 70 of the fuel pump 50. The opening of the motor operated valve 68 allows compressed air to be directed from the outlet of the engine compressor 4 through conduits 230, 64 and 66 against turbine 58 to drive the impeller 70. The impeller 70 then delivers fuel to the afterburner fuel meter 52.

Since the fuel/air ratio required by the afterburner is substantially constant, and since the gas flow through the turbine is for all practical purposes a unique function of the pressure rise across the compressor, it follows that the afterburner fuel flow requirements may be approximately met by metering the fuel flow as some function of compressor pressure rise. As will be evident from the following description, if the fuel meter of Fig. 2 is used, the afterburner fuel will be proportioned as a function of compressor rise within desired limits, and this proportion may be more or less attenuated from a rich limit to a lean limit, manually or automatically, to finely control some engine operating parameter such as turbine discharge temperature.

Fuel supplied under pressure of impeller 70 flows into passage 116, through the balanced metering valve 106, through metering orifice 112, through back pressure valve 114, and by a normally closed solenoid operated shut-off valve 128, which is now open, to conduit 74 and fuel nozzles 26. The pressure on the downstream side of the metering orifice is maintained above a predetermined valve by the back pressure valve 114. The metering valve 106 has valve seats 148 and 150 on housing 104 so that the axial displacement of the valve effects a change in the area through which the afterburner fuel must flow and since for all operating conditions the fuel flow supplied to the meter is maintained above a selected minimum value this change in area changes the fuel flow.

The bellows shown are equal in effective area and form a seal between the fuel in them and the air pressures applied to the diaphragm 166. Chamber 170 is connected by passage 206 and conduit 208 to compressor inlet pressure and chamber 172 is connected by passage 210 to compressor discharge pressure or a portion thereof as attenuated by valve 218. Bellows 186, in chamber 170, is connected by hole 173 to the pressure of the fuel upstream of orifice 112. Bellows 188, in chamber 172, is connected by passage 192 to the pressure of the fuel downstream of orifice 112. It can be seen that the compressor rise tends to open the valve 106 while the pressure drop across orifice 112 tends to close it.

As compressor rise increases this increase moves valve 106 in an opening direction increasing fuel flow, as this flow increases the pressure drop across orifice 112 increases and brings the controlling mechanism back into equilibrium. In a like manner, as the compressor rise decreases this decrease moves valve 106 in a closing direction decreasing fuel flow, as this flow decreases the pressure drop across orifice 112 decreases and brings the controlling mechanism back into equilibrium.

A pressure difference to measure engine air flow is applied to the attenuating valve assembly 110 through conduits 232 and 240. The higher pressure of this air flow sense, which may be compressor discharge pressure as shown, is applied to conduit 232. The lower pressure, which may be compressor inlet pressure as shown, is applied to conduit 240. When the restricting area formed by contour 236 cooperating with orifice 234 is large relative to the area of restriction 228, the pressure in chamber 172 approaches the low pressure of conduit 240. When the restricting area at orifice 234 is small relative to that of restriction 228, the pressure in chamber 172 approaches the high pressure of conduit 232. By rotating the valve 218 the pressure in chamber 172 may be attenuated more or less relative to the air flow indicating pressure in conduit 232. When valve 218 is rotated to reduce the area at orifice 234, the resultant higher pressures in chamber 172 urge valve 106 in an opening direction against spring 158. In a like manner an increase in the effective area of orifice 234 will cause a reduction in afterburner fuel flow by permitting valve 106 to move in a closing direction.

The valve 218 may be rotated manually, or by a suitable motor, to vary the afterburner fuel flow within limits established by the contour 236 and orifice 234. These limits can be established so as to insure a combustible mixture in the afterburner. As shown, amplifier 86 measures turbine discharge temperature by thermocouples 88 and varies afterburner fuel flow to control said temperature at a desired value. If this is to be done manually, one may look at gage 92 and move valve 218 manually until a desired temperature is reached.

If the fuel meter of Fig. 3 is used the operation will be the same as the operation in Fig. 2 except that the fuel supplied under pressure of impeller 70 flows directly into passage 118 and a part of the fuel may be by-passed from passage 118 into passage 116 through by-pass valve 106 which varies the quantity of by-passed fuel and thereby the quantity of metered fuel.

As effective compressor rise increases this increase moves valve 106 in a closing direction increasing fuel flow in a like manner, as this compressor rise decreases this decrease moves valve 106 in an opening direction decreasing fuel flow. This action differs from the action in Fig. 2 since the valve members are located on different valve seats, however in the operation of the device as shown in both Figs. 2 and 3 the valve controlling mechanism 108 moves the valve 106 in the same direction in accordance with the requirements of the pressure difference imposed on it by the effective compressor rise and pressure drop across orifice 112 and has a like effect on fuel flow.

The opening of the normally closed solenoid actuated shut-off valve 82 permits a source of fuel to be supplied to the igniter 28 through conduit 80. The pressure of the fuel in conduit 74 is transferred to the igniter control by conduit 84 which pressure permits fuel which has passed normally closed solenoid actuated valve 82 to be injected from the igniter control into a combustion chamber 8. Ignition of the injected fuel results in flame propagation through the turbine to the tail pipe resulting in ignition in the afterburner of the fuel being introduced through nozzles 26.

The ignition of fuel within the afterburner results in an increase in turbine exhaust gas pressure above that normally obtained without afterburning. This increase in pressure is transmitted to the exhaust nozzle actuator control through conduit 79. The control 76 in accordance with this pressure directs compressor discharge air from conduit 230 to the side of the cylinders nearest the nozzle which causes nozzle 44 to open through conduit 262. The pressure in this conduit 262 is transmitted by conduit 98 to a normally closed pressure switch 96 in the electrical line to the normally closed solenoid actuated shut-off valve 82 which opens said switch thereby closing the shut-off valve 82 preventing a flow of fuel to the igniter 28.

To cease operation of the afterburner the afterburner switch 94 is turned to its "off" position. This turns the temperature control amplifier 86 off thereby turning off a supply of current to a normally closed solenoid operated shut-off valve in the fuel meter and the normally closed solenoid actuated shut-off valve 82 in conduit 80. The movement of the switch to the "off" position also closes the motor operated valve 68 and turns off the afterburner fuel booster pump 48. It will be seen that with no fuel flow combustion cannot be maintained in the afterburner. This decrease in afterburner pressure is transmitted to the exhaust nozzle actuator control thereby directing compressed air through conduit 266 from conduit 230 to the side of the cylinders 130 farthest from the nozzle which causes nozzle 44 to close. This reduction of pressure in conduit 262 is conveyed to normally closed pressure switch 96 by conduit 98 thereby permitting the switch to be closed to permit current to pass to valve 82 upon the next starting of the afterburner.

Although a specific fuel meter has been shown and described herein for purpose of illustration, it will be evident to those skilled in the art that the invention is capable of various modifications and adaptations within the scope of the appended claims. The control system for an afterburner as shown in this application is shown and claimed in co-pending application Serial No. 196,425 filed November 18, 1950.

I claim:

1. In combination, a housing having an orifice, a passage on the upstream side of said orifice, and a passage on the downstream side of said orifice, a valve for controlling a flow of fuel through said orifice, a valve seat in said housing for said valve, a spring mounted between said valve and housing for biasing said valve in a closing direction, said valve having a valve stem, a valve controlling mechanism, said mechanism being located in a cavity in said housing, and having a diaphragm fixed in said cavity forming two chambers, said valve stem being fixed at its free end to said diaphragm, a first bellows in one chamber fixed at one end to one end of said cavity and at its other end to the free end of said valve stem, a second bellows in the other chamber around said valve stem fixed at one end to one end of said cavity and at its other end to the free end of said valve stem, a passage connecting the interior of said first bellows to said last named passage, said housing having a hole connecting the interior of said second bellows to said first named passage, a passage connecting one chamber and the exterior of the first bellows to an operating pressure and a passage connecting one chamber and the exterior of the second bellows to an operating pressure.

2. In combination, a housing having an inlet passage, an orifice and an outlet passage, a valve for controlling a flow of fuel through said orifice, a valve seat in said housing for said valve, a spring mounted between said valve and housing for biasing said valve in a closing direction, said valve having a valve stem, and a valve controlling mechanism, said mechanism being located in a cavity in said housing, and having a diaphragm fixed in said cavity forming two chambers, said valve stem being fixed at its free end to said diaphragm, said mechanism having a first bellows in one chamber fixed at one end to one end of said cavity and fixed at its other end to the free end of said valve stem and a second bellows in the other chamber around said valve stem fixed at one end to one end of said cavity and fixed at its other end to the free end of said valve stem, said housing having a passage connecting the interior of said first bellows to said outlet passage, said housing having a hole connecting the interior of said second bellows to said inlet passage, a passage connecting one chamber and the exterior of the first bellows to an operating pressure and a passage connecting one chamber and the exterior of the second bellows to an operating pressure.

3. In combination, a housing having an orifice, a passage on the upstream side of said orifice, and a passage on the downstream side of said orifice, a valve for controlling a flow of fuel through said orifice, a valve seat in said housing for said valve, a spring mounted between said valve and housing for biasing said valve in a closing direction, said valve having a valve stem, a valve controlling mechanism, said mechanism being located in a cavity in said housing, and having a diaphragm fixed in said cavity forming two chambers, said valve stem being fixed at its free end to said diaphragm, a first bellows in one chamber fixed at one end to one end of said cavity and at its other end to the free end of said valve stem, a second bellows in the other chamber around said valve stem fixed at one end to one end of said cavity and at its other end to the free end of said valve stem, a passage connecting the interior of said first bellows to said last named passage, said housing having a hole connecting the interior of said second bellows to said first named passage, a passage connecting one chamber and the exterior of the first bellows to an operating pressure and a passage connecting one chamber and the exterior of the second bellows to an operating pressure, said bellows being equal in effective area and co-axially aligned.

4. In combination, a housing having an inlet passage, an orifice and an outlet passage, a valve for controlling a flow of fuel through said orifice, a valve seat in said housing for said valve, a spring mounted between said valve and housing for biasing said valve in a closing direction, said valve having a valve stem, and a valve controlling mechanism, said mechanism being located in a cavity in said housing, and having a diaphragm fixed in said cavity forming two chambers, said valve stem being fixed at its free end to said diaphragm, said mechanism having a first bellows in one chamber fixed at one end to one end of said cavity and fixed at its other end to the free end of said valve stem and a second bellows in the other chamber around said valve stem fixed at one end to one end of said cavity and fixed at its other end to the free end of said valve stem, said housing having a passage connecting the interior of said first bellows to said outlet passage, said housing having a hole connecting the interior of said second bellows to said inlet passage, a passage connecting one chamber and the exterior of the first bellows to an operating pressure and a passage connecting one chamber and the exterior of the second bellows to an operating pressure, said bellows being equal in effective area and co-axially aligned.

5. In combination, a housing having a metering orifice, a passage upstream of said orifice and an outlet passage, a valve for controlling a flow of fuel through said orifice, said valve having a valve stem, a valve controlling mechanism, said mechanism being located in a cavity in said housing, and having a diaphragm fixed in said cavity forming two chambers, said valve stem being fixed at its free end to said diaphragm, a first bellows in one chamber fixed at one end to one end of said cavity and at its other end to the free end of said valve stem, a second bellows in the other chamber around said valve stem fixed at one end to one end of said cavity and at its other end to the free end of said valve stem, a passage connecting the interior of said first bellows to said outlet passage, said housing having a hole connecting the interior of said second bellows to said inlet passage, a passage connecting one chamber and the exterior of the first bellows to an operating pressure and a passage connecting one chamber and the exterior of the second bellows to an operating pressure, said passage connecting one chamber and the exterior of the first bellows to an operating pressure having a restriction therein, an orifice connecting said last named passage to bleed at a point between said restriction and the one chamber and the exterior of the first bellows, and a valve controlling the effective area of the last named orifice.

6. In combination, a housing having a metering orifice, a passage upstream of said orifice and an outlet passage, a valve for controlling a flow of fuel through said orifice, said valve having a valve stem, a valve controlling mechanism, said mechanism being located in a cavity in said housing, and having a diaphragm fixed in said cavity forming two chambers, said valve stem being fixed at its free end to said diaphragm, a first bellows in one chamber fixed at one end to one end of said cavity and at its other end to the free end of said valve stem, a second bellows in the other chamber around said valve stem fixed at one end to one end of said cavity and at its other end to the free end of said valve stem, a passage connecting the interior of said first bellows to said outlet passage, said housing having a hole connecting the interior of said second bellows to said inlet passage, a passage connecting one chamber and the exterior of the first bellows to an operating pressure and a passage connecting one chamber and the exterior of the second bellows to an operating pressure, said passage connecting one chamber and the exterior of the first bellows to an operating pressure having a restriction therein, an orifice connecting said last named passage to bleed at a point between said restriction and the one chamber and the exterior of the first bellows, and a valve controlling the effective area of the last named orifice, said valve having a cam face thereon for cooperating with said orifice.

7. In combination, a turbojet engine having a compressor, a turbine, an afterburner and an afterburner fuel meter, said fuel meter having a metering orifice, a passage upstream of said orifice, an outlet passage and valve means for controlling the fuel flow past said orifice, said means having a diaphragm fixed in a cavity in said fuel meter forming two chambers, a first bellows in one chamber fixed at one end to one end of said cavity and fixed at its other end to said diaphragm, a second bellows in the other chamber fixed at one end to one end of said cavity and fixed at its other end to said diaphragm, said fuel meter having a passage connecting the interior of said first bellows to said outlet passage, said housing having a hole connecting the interior of said second bellows to said passage upstream of said orifice, a passage connecting one chamber and the exterior of the first bellows to the discharge of the compressor and a passage connecting the other chamber and the exterior of the second bellows to the inlet of the compressor.

8. In combination, a turbojet engine having a compressor, a turbine, an afterburner and an afterburner fuel meter, said fuel meter having a metering orifice, a passage upstream of said orifice, an outlet passage and valve means for controlling the fuel flow past said orifice, said means having a diaphragm fixed in a cavity in said fuel meter forming two chambers, a first bellows in one chamber fixed at one end to one end of said cavity and fixed at its other end to said diaphragm, a second bellows in the other chamber fixed at one end to one end of said cavity and fixed at its other end to said diaphragm, said fuel meter having a passage connecting the interior of said first bellows to said outlet passage, said housing having a hole connecting the interior of said second bellows to said passage upstream of said orifice, a passage connecting one chamber and the exterior of the first bellows to the discharge of the compressor and a passage connecting the other chamber and the exterior of the second bellows to the inlet of the compressor, said passage connecting one chamber and the exterior of the first bellows to the discharge of the compressor having a restriction therein, an orifice connecting said last named passage to bleed at a point between said restriction and the one chamber and the exterior of the first bellows, and a valve controlling the effective area of the last named orifice.

9. In combination, a turbojet engine having a compressor, a turbine, an afterburner and an afterburner fuel meter, said fuel meter having a metering orifice, a passage upstream of said orifice, an outlet passage and valve means for controlling the fuel flow past said orifice, said means having a diaphragm fixed in a cavity in said fuel meter forming two chambers, a first bellows in one chamber fixed at one end to one end of said cavity and fixed at its other end to said diaphragm, a second bellows in the other chamber fixed at one end to one end of said cavity and fixed at its other end to said diaphragm, said fuel meter having a passage connecting the interior of said first bellows to said outlet passage, said housing having a hole connecting the interior of said second bellows to said passage upstream of said orifice, a passage connecting one chamber and the exterior of the first bellows to the discharge of the compressor and a passage connecting the other chamber and the exterior of the second bellows to the inlet of the compressor, said passage connecting one chamber and the exterior of the first bellows to the discharge of the compressor having a restriction therein, an orifice connecting said last named passage to bleed at a point between said restriction and the one chamber and the exterior of the first bellows, and a valve controlling the effective area of the last named orifice, said valve having a cam face thereon for cooperating with said orifice.

10. In combination, a turbojet engine having a compressor, a turbine, an afterburner and an afterburner fuel meter, said fuel meter having a metering orifice, a passage upstream of said orifice, an outlet passage and valve means for controlling the fuel flow past said orifice, said means having a diaphragm fixed in a cavity in said fuel meter forming two chambers, a first bellows in one chamber fixed at one end to one end of said cavity and fixed at its other end to said diaphragm, a second bellows in the other chamber fixed at one end to one end of said cavity and fixed at its other end to said diaphragm, said fuel meter having a passage connecting the interior of said first bellows to said outlet passage, said housing having a hole connecting the interior of said second bellows to said passage upstream of said orifice, a passage connecting one chamber and the exterior of the first bellows to the discharge of the compressor and a passage connecting the other chamber and the exterior of the second bellows to the inlet of the compressor, said passage connecting one chamber and the exterior of the first bellows to the discharge of the compressor having a restriction therein, an orifice connecting said last named passage to bleed at a point between said restriction and the one chamber and the exterior of the first bellows, and a valve controlling the effective area of the last named orifice, said bellows being equal in effective area and co-axially aligned.

11. In combination, a turbojet engine having a compressor, a turbine, an afterburner and an afterburner fuel meter, said fuel meter having a metering orifice, a passage upstream of said orifice, an outlet passage and valve means for controlling the fuel flow past said orifice, said means having a diaphragm fixed in a cavity in said fuel meter forming two chambers, a first bellows in one chamber fixed at one end to one end of said cavity and fixed at its other end to said diaphragm, a second bellows in the other chamber fixed at one end to one end of said cavity and fixed at its other end to said diaphragm, said fuel meter having a passage connecting the interior of said first bellows to said outlet passage, said housing having a hole connecting the interior of said second bellows to said passage upstream of said orifice, a passage connecting one chamber and the exterior of the first bellows to the discharge of the compressor and a passage connecting the other chamber and the exterior of the second bellows to the inlet of the compressor, said passage connecting one chamber and the exterior of the first bellows to the discharge of the compressor having a restriction therein, an orifice connecting said last named passage to bleed at a point between said restriction and the one chamber and the exterior of the first bellows, and a valve controlling the effective area of the last named orifice, said valve having a cam face thereon for cooperating with said orifice, said bellows being equal in effective area and co-axially aligned.

12. In combination, a turbojet engine having a compressor, a turbine, an afterburner and an afterburner fuel meter, said fuel meter having a metering orifice, a passage upstream of said orifice, an outlet passage and valve means for controlling the fuel flow past said orifice, said means having a diaphragm fixed in a cavity in said fuel meter forming two chambers, a first bellows in one chamber fixed at one end to one end of said cavity and fixed at its other end to said diaphragm, a second bellows in the other chamber fixed at one end to one end of said cavity and fixed at its other end to said diaphragm, said fuel meter having a passage connecting the interior of said first bellows to said outlet passage, said housing having a hole connecting the interior of said second bellows to said passage upstream of said orifice, a passage connecting one chamber and the exterior of the first bellows to the discharge of the compressor and a passage connecting the other chamber and the exterior of the second bellows to the inlet of the compressor, said bellows being equal in effective area and co-axially aligned.

13. In combination, a housing having a metering orifice, a passage upstream of said orifice and an outlet passage, a valve for controlling a flow of fuel through said orifice, said valve having a valve stem, a valve controlling mechanism, said mechanism being located in a cavity in said housing, and having a diaphragm fixed in said cavity forming two chambers, said valve stem being fixed at its free end to said diaphragm, a first bellows in one chamber fixed at one end to one end of said cavity and at its other end to the free end of said valve stem, a second bellows in the other chamber around said valve stem fixed at one end to one end of said cavity and at its other end to the free end of said valve stem, a passage connecting the interior of said first bellows to said outlet passage, said housing having a hole connecting the interior of said second bellows to said inlet passage, a passage connecting one chamber and the exterior of the first bellows to an operating pressure and a passage connecting one chamber and the exterior of the second bellows to an operating pressure, said passage connecting one chamber and the exterior of the first bellows to an operating pressure having a restriction therein.

14. In combination, a housing having a metering orifice, a passage upstream of said orifice and an outlet passage, a valve for controlling a flow of fuel through said orifice, said valve having a valve stem, a valve controlling mechanism, said mechanism being located in a cavity in said housing, and having a diaphragm fixed in said cavity forming two chambers, said valve stem being fixed at its free end to said diaphragm, a first bellows in one chamber fixed at one end to one end of said cavity and at its other end to the free end of said valve stem, a second bellows in the other chamber around said valve stem fixed at one end to one end of said cavity and at its other end to the free end of said valve stem, a passage connecting the interior of said first bellows to said outlet passage, said housing having a hole connecting the interior of said second bellows to said inlet passage, a passage connecting one chamber and the exterior of the first bellows to an operating pressure and a passage connecting one chamber and the exterior of the second bellows to an operating pressure, said passage connecting one chamber and the exterior of the first bellows to an operating pressure having a restriction therein, an orifice connecting said last named passage to an operating pressure at a point between said restriction and the one chamber and the exterior of the first bellows, and a valve controlling the effective area of the last named orifice.

References Cited in the file of this patent
UNITED STATES PATENTS

| | | |
|---|---|---|
| 2,442,046 | Hunt | May 25, 1948 |
| 2,498,939 | Bobier | Feb. 28, 1950 |